United States Patent
Murakami et al.

(10) Patent No.: US 6,527,161 B2
(45) Date of Patent: Mar. 4, 2003

(54) METHOD OF CONNECTING ELECTRIC WIRES

(75) Inventors: Kazuhiro Murakami, Shizuoka (JP); Kenichi Hanazaki, Shizuoka (JP); Yoshihiko Watanabe, Shizuoka (JP); Hiroyuki Murakoshi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/921,778

(22) Filed: Aug. 6, 2001

(65) Prior Publication Data

US 2002/0017550 A1 Feb. 14, 2002

(30) Foreign Application Priority Data

Aug. 7, 2000 (JP) ........................................ 2000-238228

(51) Int. Cl.[7] ............................. B23K 1/06; B23K 31/02
(52) U.S. Cl. .................. 228/110.1; 228/175; 228/180.5
(58) Field of Search ............................... 228/180.5, 4.5, 228/110.1, 1.1, 175

(56) References Cited

U.S. PATENT DOCUMENTS 3,822,465 A * 7/1974 Frankort et al.
6,273,322 B1 * 8/2001 Yamamoto et al.
6,334,251 B1 * 1/2002 Ide

FOREIGN PATENT DOCUMENTS

| | | | |
|---|---|---|---|
| DE | 19636217 A1 | * | 3/1998 |
| EP | 0834956 A2 | * | 4/1998 |
| EP | 0886338 A2 | * | 12/1998 |
| GB | 2335092 A | * | 9/1999 |
| GB | 2350732 A | * | 12/2000 |
| JP | 7-335359 | | 12/1995 |
| JP | 09320650 A | * | 12/1997 |
| JP | 09320652 A | * | 12/1997 |

OTHER PUBLICATIONS

US 2002/0017550A1 Murakami et al. (Feb. 14, 2002).*

* cited by examiner

Primary Examiner—M. Alexandra Elve
Assistant Examiner—Kiley Stoner
(74) Attorney, Agent, or Firm—Armstrong, Westerman & Hattori, LLP

(57) ABSTRACT

The object is to provide a method of connecting covered wires mutually which can solve increasing cost. Each of the covered wires 2, 3 is comprised of a conductor 4, 10 and a cover 5, 11. The covered wires 2, 3 are connected to each other by ultrasonic welding. An ultrasonic welding machine includes a chip and an anvil. The covered wires 2, 3 are placed between the chip and the anvil. The chip is located with the length of its cross section disposed along the length of the other covered wire 3. The chip and the anvil are pushed toward each other and the chip is vibrated. Friction heat is generated between the covered wires 2, 3. The covers 5, 11 are adhered together and the conductors 4, 10 are bonded to each other by ultrasonic welding.

1 Claim, 3 Drawing Sheets

METHOD OF CONNECTING ELECTRIC WIRES

BACKGROUND OF THE INVENTION

1. Field of the Invention

This invention relates to a method of connecting plural covered wires to each other.

2. Description of the Related Art

In an automobile as a transferring object, a wiring harness is provided to supply electric power of a battery to installed electronic devices, such as various lamps and motors, and send control signals of a control unit to the electronic devices. The wiring harness has plural covered wires, or the like. At least some of the plural wires comprising the wiring harness are required to connect to each other.

When connecting conductors of the covered wires to each other, firstly, the cover of the wire is removed at a connecting point. After that, the conductors are connected by welding, like resistance welding. Or, as another connection method, pressure contact or crimp contact with other conductive metal parts, different from the conductor, is used to connect the conductors of the covered wires to each other.

Methods of connecting covered wires mutually according to the prior art, as mentioned above, require removing the cover of covered wires. Consequently, the time and effort for performing the work operations increases. Further, using additional other metal parts makes the number of parts increase. Therefore, methods of connecting covered wires by prior art methods produce a cost increase.

SUMMARY OF THE INVENTION

This invention has been accomplished to overcome the above drawbacks and an object of this invention is to provide a method of connecting covered wires mutually which can avoid cost increasing.

In order to attain the objects, a method of connecting covered wires according to this invention is comprised of the steps of placing a covered wire on the other covered wires and welding conductors of the covered wires to each other by ultrasonic welding.

In the method of connecting covered wires, as mentioned above, the covers of each of the covered wires are adhered to each other by the above ultrasonic welding.

In each method of connecting covered wires, as mentioned above, one covered wire and the other covered wire are clamped by a chip and an anvil, correspondingly and mutually, of an ultrasonic welding machine and said chip is placed in straddling form on one covered wire and the covered wires are connected by ultrasonic welding.

Since the connection of the covered wires according to this invention is done by ultrasonic welding in the condition of placing a covered wire on other covered wires, removing the cover on the connection point of the covered wires is not required to connect covered wires to each other. Since the covered wires are ultrasonic welded mutually one upon another, other metallic parts different from the covered wires are not required to connect the covered wires to each other. The covered wire, which has a round cross section, is preferable. In case of the wire with a round cross section shape, the cover is removed securely from a gap between each conductor by ultrasonic welding. Therefore, the method can perform to connect each conductor securely without a need of removing the cover.

Advantageously, in the above method of connecting covered wires mutually according this invention, since the covers adhere to each other by ultrasonic welding, the mechanical strength of the point where the conductors are connected mutually can be improved. Further, since the covers adhere to each other, the conductors can be connected securely to each other without a need of removing the covers.

Advantageously, in the above method of connecting electric wires mutually according this invention, the chip of an ultrasonic machine is placed with straddling form on one covered wire. Therefore, the conductor of one covered wire, which the chip contacts, is pushed securely toward the conductor of the other covered wire and connecting conductors to each other can be done more securely. In this method of connecting electric wires, the chip may be formed either larger or smaller than the larger diameter of one covered wire which the chip contacts by ultrasonic welding or the other covered wire along the radius direction of the covered wire.

Preferably, in this method, the chip is formed in strip shape. When one covered wire and the other covered wire, as mentioned above, are disposed to cross each other one upon another, the cross section of the chip along the length of the covered wire may cross one of the covered wires to be contacted by ultrasonic welding and be along the length of the other.

In this condition of two covered wires crossing each other, the chip contacts one covered wire along the length of the covered wire and crosses the other covered wire. Then, the top of the chip dents one covered wire that the chip contacts. Therefore, the chip can press securely the conductor of one contacted covered wire toward the conductor of the other covered wire, and connect tightly the conductors to each other.

In the condition of placing one covered wire and other covered wire in parallel one upon another, the length of the strip shape chip on the cross section along the length direction of the covered wires is aligned preferably along the length of the covered wires which are placed in parallel one upon another. In this case, the thickness, perpendicular to the length of the chip on the cross section along the length direction of the covered wires, may be larger or smaller than the diameter of the covered wires.

The chip is placed with its length along the length direction of covered wires disposed parallel to each other, and stacked one on another. The top of the chip dents one covered wire that the chip contacts. Therefore, the chip can press securely the conductor of one contacted covered wire toward the conductor of the other covered wire, and connect tightly the conductors to each other.

SUMMARY OF THE INVENTION

As mentioned above, according to an aspect of this invention, covered conductors can be bonded to each other without need of removing the covers, since the covered wires are connected mutually by ultrasonic welding. Other metal parts, different from these covered wires, are not required to connect covered wires mutually since covered wires are connected mutually one upon another by ultrasonic welding. Therefore, the time, effort and number of parts for connecting the covered wires 2, 3 can be reduced and the cost also can be reduced.

According to another aspect of this invention, cost reduction for connecting covered wires mutually is not the only benefit, but mechanical strength at the connecting point of the covered wires can also be improved, since the covers are adhered to each other when connecting the wires by ultrasonic welding.

According to yet another aspect of this invention, a chip is located by saddles on one covered wire which is contacted by the chip in case of crossing covered wires one upon another to each other. Therefore, the chip pushes more securely a conductor positioned above one covered wire, contacted by the chip, toward a conductor of the other covered wire. Then, time, effort and the number of parts for connecting the covered wires 2, 3 are not only reduced but the conductors can be also bonded more tightly.

DESCRIPTION OF THE PREFERRED EMBODIMENT

Figure 1:
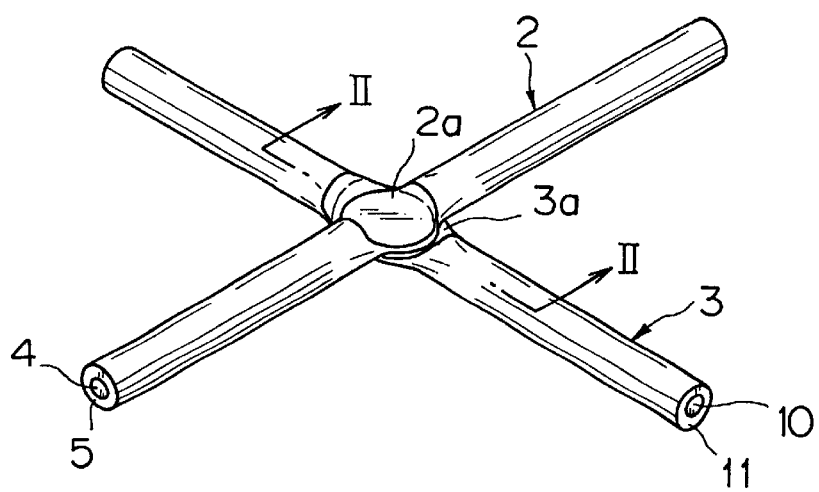
FIG. 1 is a perspective view of covered wires connected by the method of connecting electric wires according to the first embodiment of this invention.

A structure of connecting mutually covered wires as the first embodiment according to this invention will now be described with reference to FIG. 1 or FIG. 6. The connecting structure as the embodiment according to this invention is to connect one covered wire 1 and another covered wire 3 to each other, as shown in FIG. 1 or FIG. 2.

The covered wire 2 is formed into a round shape cross section. The covered wire 2 includes a conductor 4 with a round shape cross section and a cover 5 for covering the conductor 4. The conductor 4 is flexible wire and made of electrical conductive metal. The conductor 4 includes at least copper or copper alloy. The cover 5 is flexible and made of electrically non-conductive synthetic resins, such a polyvinylchloride (PVC) or the like.

The covered wire 3 is formed into a round shape cross section. The covered wire 3 includes a conductor 10 with a round shape cross section, and a cover 11 for covering the conductor 10. The conductor 10 is flexible wire and made of electrically conductive metal. The conductor 10 includes at least copper or copper alloy. The cover 11 is flexible and made of electrically non-conductive synthetic resins such a polyvinylchloride (PVC), or the like. The covered wires 2, 3 have the same wire diameter as, for example, shown in the drawing.

Figure 2:
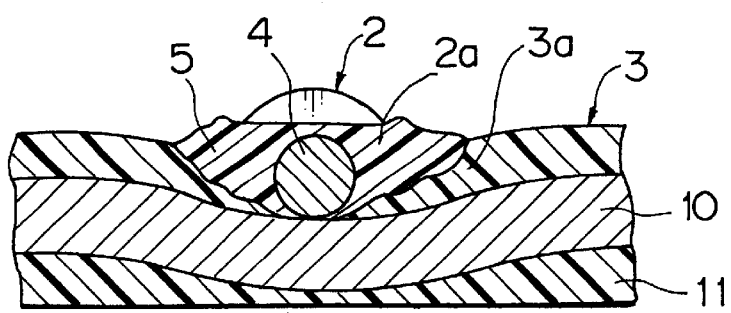
FIG. 2 is a sectional view taken along the line II—II of FIG. 1.

The covered wires 2, 3 are placed one upon another, to cross each other, as shown in FIG. 1, 2. And at a connecting point of each area 2a, 3a, the covers 5, 11 are adhered to each other and the conductors 4, 10 are connected to each other in a condition of metallic bonding. In this drawing as an example, the covered wires 2, 3 cross each other and are connected to each other by an ultrasonic welding machine. And in this drawing, the connecting point of area 2a, 3a is located in the center of the length of the covered wire 3.

The ultrasonic welding machine includes a chip 20, an anvil 21 corresponding to the chip 20 and a not-shown oscillator, vibrator, a cone, a horn. The chip 20 is formed into strip shape. In this example of the chip 20, the width W (shown in FIG. 3) is formed to be larger than the outer diameters of the covered wires 2, 3. In this invention, the width W (shown in FIG. 3) formed smaller than the outer diameters of the covered wires 2, 3 is also effective. The width W may be a length of the cross section of the chip 20 disposed along the length of the covered wire 2, 3 when connecting to each other, as described hereinafter. The width W may be a length along the radius direction of the covered wire 2, as described later. The anvil 21 is provided with a flat surface on which welding objects can be placed.

In the ultrasonic welding machine, objects to be welded mutually are clamped between the chip 20 and the anvil 21. Pressing the objects by the chip 20 and the anvil 21 to be closer mutually, the vibrator is vibrated by the oscillator and the vibration through the cone and the horn is transmitted to the chip 20. Then, the ultrasonic welding machine supplies ultrasonic vibration on the welding objects, clamped between the chip 20 and the anvil 21, and welds the objects by frictional heating.

Figure 3:
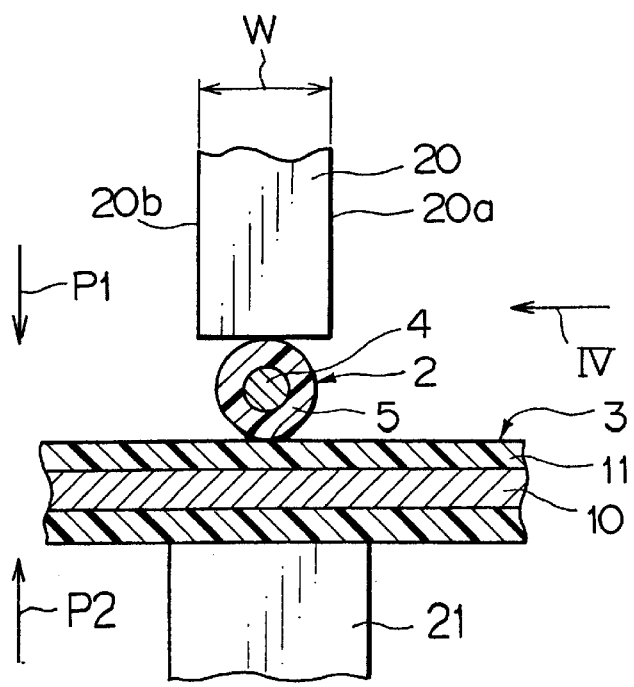
FIG. 3 is a sectional view of a condition before connecting covered wires to each other in this embodiment.
Figure 4:
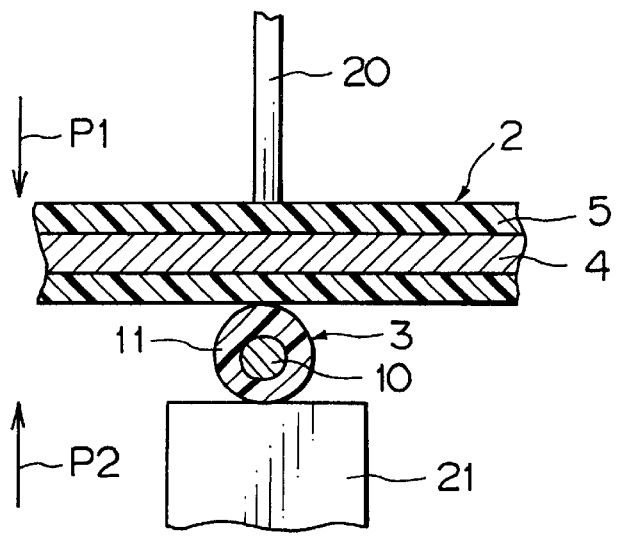
FIG. 4 is a sectional view seen from an arrow IV of FIG. 3.
Figure 5:
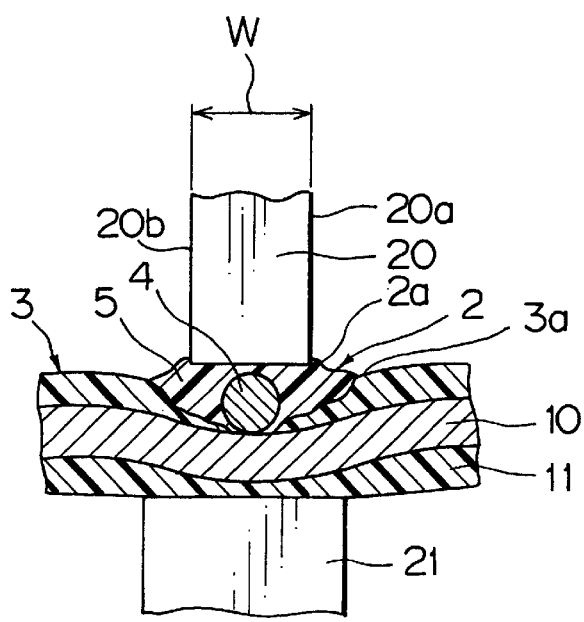
FIG. 5 is a sectional view of a condition after connecting covered wires to each other in this embodiment.

To connect the covered wires 2, 3 to each other in a crossing figure, the covered wires 2, 3 are clamped between the chip 20 and the anvil 21, as shown in FIG. 3, 4. In this moment, the covered wires 2, 3 cross each other and are placed one upon another at area 2a, 3a. And the chip 20 contacts area 2a of the covered wire 2, one of the covered wires 2, 3.

Figure 6:
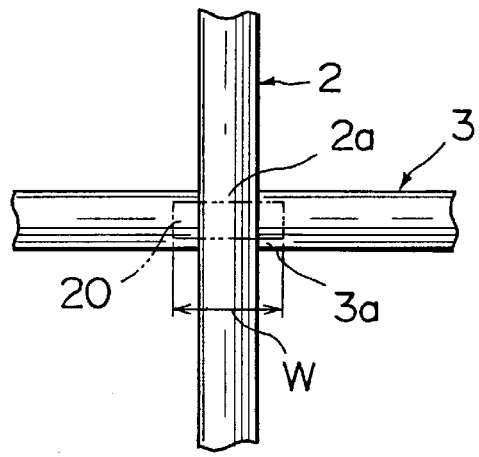
FIG. 6 is a drawing for explaining the method of connecting electric wires in this embodiment, to show covered wires, a chip, vibrating direction of the chip and others as a model.

The chip 20 is aligned as the length of its cross section along a plane by the covered wires 2, 3 crosses one covered wire 2 and is placed along the other covered wire 3, as shown in FIG. 3 or 6. In the drawing as an example, the chip 20 is aligned as the length crosses the covered wire 2 and is placed along the covered wire 3.

Furthermore, the chip 20 is located as one covered wire 2 is placed between both edges 20a, 20b along the length of the covered wire. And the chip 20 is located as the both edges 20a, 20b are juxtaposed along the radius direction of one covered wire 2. In short, the chip 20 is located as straddling on the covered wire 2. In the drawing as an example, the chip 20 is located as the both edges 20a, 20b straddles on one covered wire 2.

The chip 20 and the anvil 21 are pushed toward each other in the direction of arrows P1, P2 shown in FIG. 3. Then, the top of the chip 20 dents the area 2a of the covered wire 2 which the top of the chip 20 contacts. After that, vibration of the vibrator, vibrated by the oscillator is transmitted to the chip 20 through the cone and the horn.

Since the area 2a, contacted by the top of the chip 20 of the covered wire 2, is dented, one covered wire 2 is vibrated together with the chip 20. Friction heat developed by the vibration level is produced between the covered wires 2, 3 and the covers 5, 11 are melted.

Since the chip 20 and the anvil 21 are pushed toward each other and the covers 5, 11 are melted, the conductors 4, 10 are contacted mutually. When contacting the conductors to each other, the conductors 4, 10 are metallic bonded together without melting by the above friction heat. In other words, the conductors 4, 10 are connected mutually by the so-called ultrasonic adhesion (ultrasonic welding or ultrasonic bonding). Since the covers 5, 11 are adhered mutually and the conductors 4, 10 are bonded together, the covered wires 2, 3 are connected to each other.

In the embodiment according to this invention, the covers 5, 11 are adhered mutually and the conductors 4, 10 are bonded together by ultrasonic welding. Therefore, a need for removing a cover is not required and other metal parts also are not required to connect the covered wires 2, 3. Then, man-hours and the number of parts for connecting the covered wires 2, 3 can be reduced and the cost also can be reduced.

The covers 5, 11 are adhered to each other at the area 2a, 3a which are the connecting point of the covered wires 2, 3. Then, the mechanical strength at the connecting point of the covered wires 2, 3 can be improved. Therefore, the covered wires 2, 3 are connected tightly.

The chip 20 is located as the length of the chip cross section crosses one covered wire 2 and straddles on this covered wire 2. Therefore, the chip 20 can push securely the conductor 4 toward the other covered wire 3. Then, the conductors 4, 10 are bonded securely and the covered wires 2, 3 are connected tightly.

Since the chip 20 dents one covered wire 2, the covered wire 2 is vibrated securely together with the chip 20. Then, the conductors 4, 10 are bonded together securely and the covered wires 2, 3 can be connected more tightly.

Figure 7:
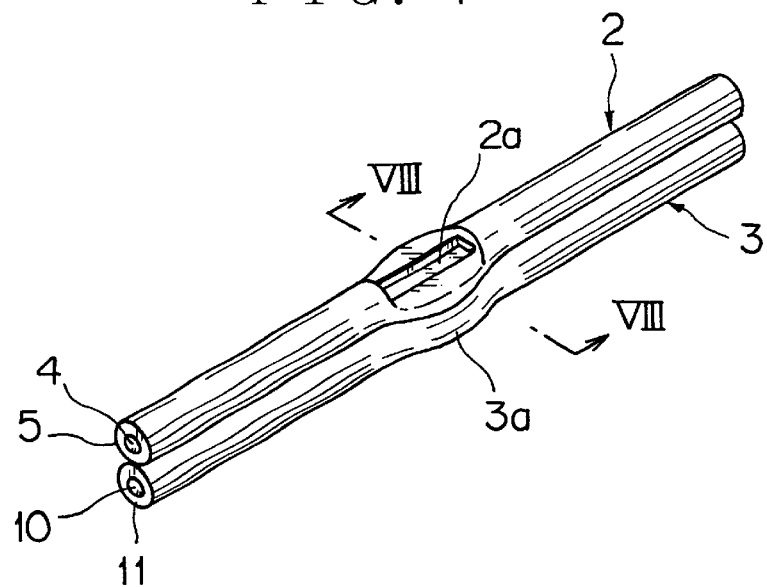
FIG. 7 is a perspective view of covered wires connected by a method of connecting electric wires according to the second embodiment of this invention.
Figure 11:
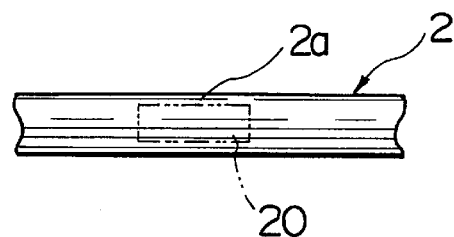
FIG. 11 is a drawing for explaining the method of connecting electric wires in this embodiment, to show covered wires, a chip, vibrating direction of the chip and others as a model.

The second embodiment of the method of connecting electric wires according to this invention will now be described with reference to FIG. 7 or FIG. 1. The same comprising parts as the first embodiment, mentioned above, are assigned the same marking and an explanation of the parts is omitted.

Figure 8:
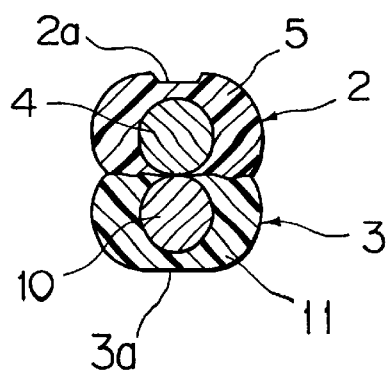
FIG. 8 is a sectional view taken along the line VIII—VIII of FIG. 7.

In this embodiment, the covered wires 2, 3 are connected in parallel one upon another mutually. In the drawing as an example, the covered wires 2, 3 are stacked in parallel one upon another. In this embodiment, the covers 5, 11 adhere to each other at the area 2a, 3a and the conductors 4, 10 are connected mutually by metallic bonding, as mentioned with respect to the first embodiment, as shown in FIG. 8.

Figure 9:
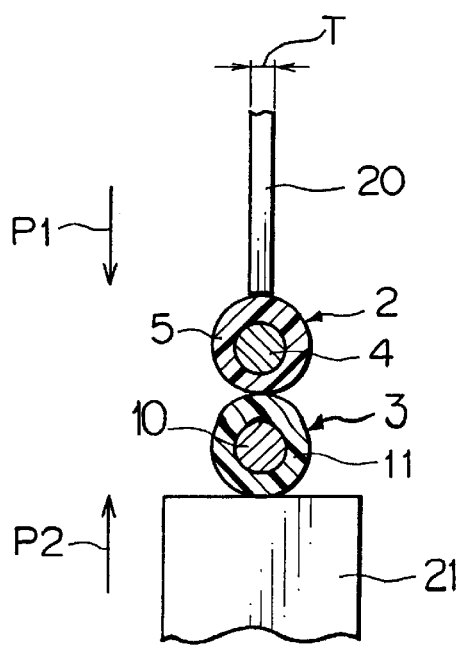
FIG. 9 is a sectional view of a condition before connecting covered wires to each other in this embodiment.

In this embodiment, the covered wires 2, 3 are connected to each other by an ultrasonic welding machine as mentioned with respect to the first embodiment. Firstly, to connect the covered wires 2, 3 to each other in parallel, the covered wires 2, 3 are clamped at area 2a, 3a between the chip 20 and the anvil 21, as shown in FIG. 9. In this moment, the chip 20 is placed as the length of the cross section is juxtapositional along the length of the covered wires 2, 3. In this embodiment, the thickness T (shown in FIG. 9, 10) of the chip 20, disposed perpendicular to the direction of the length of the cross section along the covered wires 2, 3, may be larger or smaller than the outer diameters of the covered wires 2, 3.

Next, the chip 20 and the anvil 21 are pushed toward each other in the direction of arrows P1, P2 shown in FIG. 9. The top of the chip 20 dents the area 2a of the covered wire 2 which the top of the chip 20 contacts. Vibration of the vibrator, vibrated by the oscillator is transmitted to the chip 20 and the chip 20 is vibrated. One covered wire 2 is vibrated together with the chip 20 and friction heat is given between the covered wires 2, 3.

Figure 10:
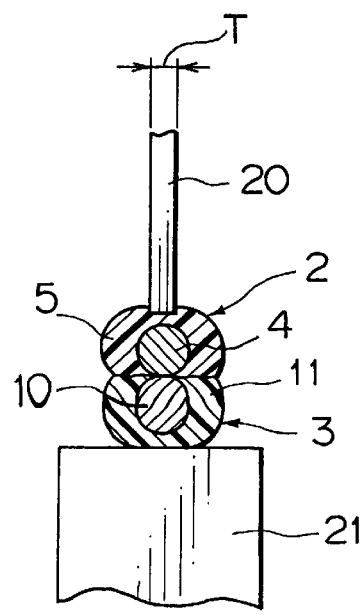
FIG. 10 is a sectional view of a condition after connecting covered wires to each other in this embodiment.

The covers 5, 11 are melted by the above friction heat. When the covers 5, 11 are melted, the conductors 4, 10 are contacted to each other as shown in FIG. 10. When contacting the conductors to each other, the conductors 4, 10 are metallic bonded together without melting by the above friction heat. In other words, the conductors 4, 10 are connected mutually by the so-called ultrasonic adhesion (ultrasonic welding or ultrasonic bonding). Since the covers 5, 11 are adhered mutually and the conductors 4, 10 are bonded together, the covered wires 2, 3 are connected to each other.

In the embodiment according to this invention, the covers 5, 11 are adhered mutually and the conductors 4, 10 are bonded together by ultrasonic welding and then the covered wires 2, 3 are connected to each other, as mentioned with regard to the first embodiment. Therefore, man-hours and the number of parts for connecting the covered wires 2, 3 can be reduced and the cost also can be reduced. Furthermore, the mechanical strength at the connecting point of the covered wires 2, 3 is improved and the covered wires 2, 3 can be connected tightly.

In this embodiment, the chip 20 is located with its length disposed along the covered wires 2, 3. Since the chip 20 dents the covered wire 2, the chip 20 can vibrate the covered wire 2 securely. Therefore, the chip 20 can push securely the covered wires 2, 3 toward each other and the conductors 4, 10 are bonded to each other.

In the first and second embodiments, since each of the covered wires 2, 3 is formed into a round shape cross section, the pressing force, loaded on the chip 20 and the anvil 21 in the direction of arrows P1, P2, concentrates on a mutual contact point of the covered wires 2, 3. Therefore, the covers 5, 11 are removed securely from a gap between the conductors 4, 10. Then, the conductors 4, 10 can be bonded tightly to each other without need for removing the covers on the covered wires 2, 3.

In the embodiments mentioned above, the covered wires 2, 3 having each of the conductors 4, 10 as single core wires are connected. In this invention, connecting mutually plural covered wires formed with a cover and a stranded conductor by stranding plural conductors is also effective. In such a case, the stranded conductors are bonded to each other.

What is claimed is:

1. A method of connecting covered electric wires comprising the steps of:

placing one covered wire on another covered wire, clamping the wires by a chip and an anvil, wherein the chip is placed in contact with one of the covered wires with the longitudinal width of the chip axially aligned ia a non-straddling manner with said one covered wire in the length direction and the anvil disposed in a straddling position with respect to the other covered wire, and welding the covered wires to each other by ultrasonic welding wherein covers of the respective covered wires adhere to each other and conductors of said covered wires are welded together.

* * * * *